(12) United States Patent
Goodsitt et al.

(10) Patent No.: US 11,849,044 B2
(45) Date of Patent: *Dec. 19, 2023

(54) LOCAL DEVICE AUTHENTICATION SYSTEM

(71) Applicant: Capital One Services, LLC, McLean, VA (US)

(72) Inventors: Jeremy Edward Goodsitt, Champaign, IL (US); Austin Grant Walters, Savoy, IL (US); Vincent Pham, Champaign, IL (US); Reza Farivar, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/732,767

(22) Filed: Apr. 29, 2022

(65) Prior Publication Data
US 2022/0263659 A1   Aug. 18, 2022

Related U.S. Application Data

(63) Continuation of application No. 16/863,638, filed on Apr. 30, 2020, now Pat. No. 11,349,664.

(51) Int. Cl.
*H04L 9/32* (2006.01)

(52) U.S. Cl.
CPC .................. *H04L 9/3226* (2013.01)

(58) Field of Classification Search
CPC . H04L 9/3226; H04L 2209/76; H04L 9/3271; H04L 9/3215; H04L 2209/805
See application file for complete search history.

(56) References Cited

U.S. PATENT DOCUMENTS

| | | | |
|---|---|---|---|
| 10,536,436 B1* | 1/2020 | Barbour | H04L 63/0838 |
| 2013/0139222 A1* | 5/2013 | Kirillin | H04L 67/02 |
| | | | 726/4 |
| 2016/0286393 A1* | 9/2016 | Rasheed | H04L 63/0853 |
| 2019/0089717 A1* | 3/2019 | Dolev | G06F 21/31 |
| 2020/0204540 A1* | 6/2020 | Shah | H04L 63/0838 |

* cited by examiner

*Primary Examiner* — Henry Tsang
(74) *Attorney, Agent, or Firm* — KDW Firm PLLC

(57) ABSTRACT

Various embodiments are generally directed to provide a semi-local authentication scheme. A server can transmit one or more encryption mechanisms to a user device, which in turn can transmit the encrypted mechanisms to one or more secondary devices associated with the user device, where the user device and the secondary devices share a local connection. The secondary devices can transmit the one or more encrypted mechanism utilizing one or more one or more decryption mechanisms supplied by the server, and then transmit the result of the decryption, e.g. decrypted codes, back to the user device, which in turn can then transmit a final decrypted code or codes to the server. Upon confirming receipt of the decryption from the user device, the server can authorize access (via the user device) to one or more devices, networks, applications, and/or components.

20 Claims, 5 Drawing Sheets

LOCAL DEVICE AUTHENTICATION SYSTEM

RELATED APPLICATION

This application is a continuation application of U.S. patent application Ser. No. 16/863,638, filed Apr. 30, 2020, titled "LOCAL DEVICE AUTHENTICATION SYSTEM". The contents of the aforementioned applications are incorporated herein by reference.

BACKGROUND

The present embodiments relate to increasing the security associated with network access and encrypted material.

There are numerous techniques associated with the encryption and decryption of messages and/or accessing networks and computer devices associated therewith. Nevertheless, despite the increased efficiency of actual encryption techniques, security vulnerabilities still exist and can compromise the security (and associated contents) of a transmitted message, computer network, and/or devices associated with the computer network.

Accordingly, there is a need to improve the security associated with accessing a network and/or devices associated therewith.

SUMMARY

One aspect of the present disclosure includes a computer implemented method for obtaining access to a network and/or a device associated with a network. The method can include: transmitting an authentication credential from a user device to at least one server, validating the authentication credential at the at least one server, transmitting, from the at least one server, one or more encrypted codes to one or more secondary devices, wherein the one or more secondary devices share a common network connection with the user device, decrypting each one of the one or more encrypted codes on at least one of the one or more secondary devices, transmitting each decrypted version of the one or more encrypted codes to the user device, transmitting each decrypted version or a final combined version of the one or more encrypted codes to the at least one server, permitting access to a computer device based on the transmission of the decrypted version of the one or more encrypted codes to the at least one server, where the decryption occurs only if the common network connection exists, and where the common network connection is selected from the group consisting of: i) a Bluetooth network connection, ii) an intranet network connection, iii) a near field communication (NFC) connection, and iv) a mesh network connection.

Another aspect of the present disclosure includes an apparatus configured to for obtaining access to a network and/or a device associated with a network. The apparatus includes: a processor circuit, and a memory storing instructions which when executed by the processor circuit, cause the processor circuit to: validate an authentication credential received from a user device, periodically transmit one or more one or more decryption mechanisms to one or more secondary devices, wherein the one or more secondary devices share a common network connection with the user device, and wherein the one or more one or more decryption mechanisms are associated with one or more encrypted codes received by the user device, receive a decrypted version of at least one of the one or more encrypted codes from the user device, authorize access to a computer device based on the at least one decryption, and where the decryption is received only if the common network connection exists between the user device and the one or more secondary devices.

Yet another aspect of the present disclosure includes a non-transitory computer-readable storage medium having computer-readable program code embodied therewith, the computer-readable program code executable by a processor circuit to cause the processor circuit to: receive, from at least one server, a confirmation that an authorization credential is valid, after receipt that the authorization credential is valid, receive, from one or more secondary devices, at least one decrypted version of one or more encrypted codes, wherein the one or more encrypted codes are transmitted from the at least one server to the user device, transmit the at least one decrypted version of the one or more encrypted codes to the at least one server, wherein the one or more secondary devices share a common network connection with the user device, and receive access to a computer device based on the transmission of the at least one decrypted version of the one or more encrypted codes, wherein receipt of the least one decrypted version of the one or more encrypted codes occurs only if the common network connection exists.

DETAILED DESCRIPTION

Figure 1:
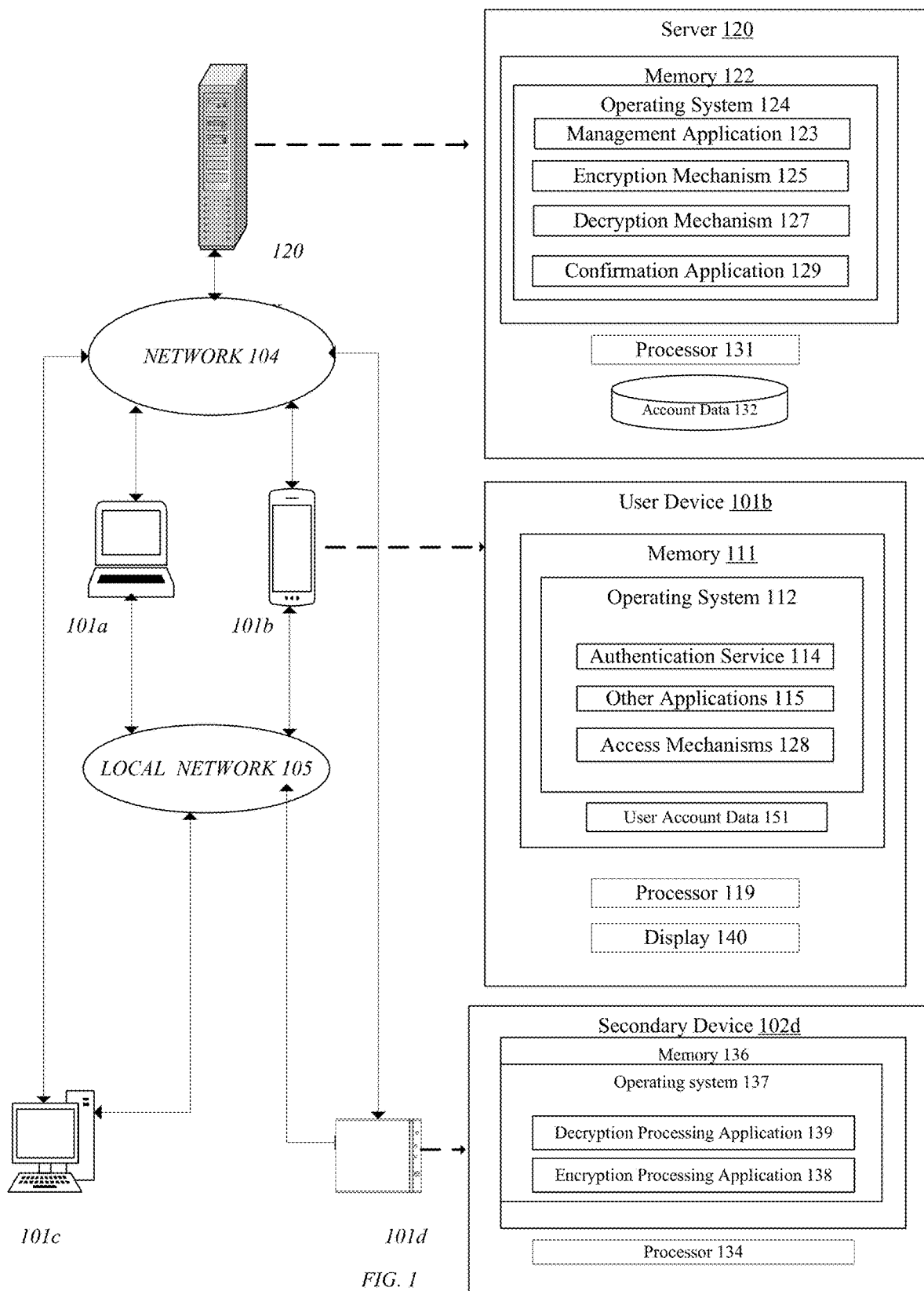
FIG. 1 illustrates an example of a system and one or more components of a system for performing a verification and/or authentication operation to grant access to one or more devices, networks, components and/or applications and according to at least one embodiment of the present disclosure.

Various embodiments are generally directed to techniques, systems, and processing flows to improve the security of network access, including accessing one or more devices associated with the network, and/or the transmission, receipt and/or access of material associated with the network.

In various embodiments, one or more servers transmit encryption and one or more decryption mechanisms to various user devices and/or secondary devices over a first network, e.g. the internet or other suitable connection. A user device can seek access to one or more applications associated with the one or more servers, one or more applications associated with the one or more secondary devices, and/or one or more aspects of another network associated with the secondary devices. In various embodiments, in order to obtain the desired access, the user device can initiate an authentication protocol with the one or more servers, which can include an initial verification or authentication, e.g. the user enters a username and password credential via an interface that communicates with the one or more servers via the first network, and the one or more servers can confirm the identity of the user by making a comparison of the information with account (or other) information accessible the one or more servers. In various embodiments, once the initial verification is confirmed, at the direction of the user device and/or the one or more servers, the one or more servers can transmit one or more encrypted codes to the user device, which in turn transmit the relevant portions to the one or more of the secondary devices. In various embodiments, each secondary device can perform a decryption on the encrypted code it receives in relation to the transmitted encrypted codes.

In various embodiments, the user device can transmit the one or more encoded mechanisms received from the server and/or receive and/or compile the various decrypted codes from the secondary devices by communicating with the secondary devices via a second local network, e.g. a Bluetooth, intranet, any suitable nearfield communication (NFC), mesh network, etc. The feature of compiling the decrypted codes over the second network provides for an additional security mechanism by prohibiting devices that cannot access the local network from misappropriating the decrypted codes, while also making the overall authentication more efficient by providing for a second authentication mechanism, without requiring the user to enter additional material via a suitable interface of the user device, which is in contrast with some two-factor authentication techniques.

Accordingly, one or more embodiments provide for at least two authentication mechanisms in an overall authentication protocol, which can improve both the security and the efficiency of the overall authentication mechanism by, in some embodiments, requiring that the user enter authentication credentials only once during the overall authentication protocol.

Reference is now made to the drawings, wherein like reference numerals are used to refer to like elements. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 depicts a schematic of an exemplary system 100, consistent with disclosed embodiments, where a detailed depiction of at least one embodiment with at least three components of the system, e.g. the server 120, the user device 102b, and the secondary device 102d is shown. As shown, the system 100 depicts an overall operational depiction of one or more embodiments of the present disclosure. One or more servers 120 communicate with one or more user devices 102b (e.g. a mobile device) and one or more secondary devices 102a, 102c, and/or 102d over a network 104, where the network 104 can be any suitable network for device communications, including the internet. The one or more servers 120 is representative of any type of computing device, such as a server, workstation, computer cluster, cloud computing platform, virtualized computing system, and the like. The user device 102b can be any suitable computing device useful to a user, e.g. a such as smartphones, desktop computers, tablet computers, wearable devices, laptops, portable gaming devices, and the like. Similarly, the secondary devices 102a, 102c, and/or 102d can also be any suitable computing device, such as such as smartphones, desktop computers, tablet computers, wearable devices, laptops, portable gaming devices, and the like.

The one or more secondary devices 102a, 102c, and 102d can communicate with the one or more user devices 102b over a second network 105, where the second network can be a local or internal network, including any suitable common connections, such as a Bluetooth network, an intranet network, a near field communication (NFC), and/or a mesh network.

In various embodiments, the one or more servers 120 have one or more applications for providing a suitable encryption and/or decryption mechanism to grant access to one or more aspects or applications associated with the one or more servers 120, one or more aspects or applications associated with the secondary devices, one or more aspects or applications associated with other devices that are accessible through either network 104 and/or network 105, and/or access to one or more features associated with network 105 and/or a third network. In various embodiments, the one or more servers 120 can transmit the one or more one or more encryption mechanisms to the user device 102b and/or one or more one or more decryption mechanisms to the one or more secondary devices 102a, 102c, and/or 102d via the network 104. In various embodiments, the encrypted mechanisms can also be sent the individual secondary devices 102a, 102c, and/or 102d via the network 104, e.g. where the encryption/decryption technique associated with the encryption and one or more decryption mechanisms is such that doing so increases efficiency, enhances security and/or is required as a result of the associated technique.

In various embodiments, the user device 102b can transmit each encoded mechanism received from the one or more servers to the one or more secondary devices 102a, 102c, and 102d via network 105. In various embodiments, each decryption mechanism received by each secondary device 102a, 102c, and/or 102d can be unique to a particular secondary device, with the decryption mechanism associated with a particular secondary device having a unique characteristic in relation to that decryption mechanism, which is combined at and by the user device 102b (e.g. via network 105) to form the final decrypted code that is transmitted back to the one or more servers 120 (e.g. via network 104) to obtain access to the network, application, or device at issue. In various embodiments, the combination of the final encrypted code can occur at the server and/or the decrypted code portions can otherwise be utilized by the server to grant the access to the network, application, or device at issue.

In various embodiments, the user device 102b has one or more applications that provide authentication credentials to the one or more servers 120, which once verified, triggers a second portion of the overall authentication protocol, namely that each decryption mechanism of each secondary device 102a, 102c, and 102d are routed to the user device 102b via the local network 105 and combined or concatenated at the user device 102b prior to transmission to the one or more servers via network 105. Once the one or more servers 120 receive the decrypted codes from the user device 102b, the user device 102b can receive access to the relevant network, device and/or application.

As shown, the user device 102b includes a display 140 that can display information to a user and server as an I/O mechanism (e.g. touch screen) for the user to input information. The user device 102b can further include additional interfaces (not shown), e.g. keyboards, touchpads, etc. for the user to enter and receive information therefrom.

In various embodiments, the user device 102b can include memory 111 and a processor 119 for executing one or more operations in relation to the user device 102b. In various embodiments, the memory 111 can include an instance of an operating system (OS) 112 and a processor 119 may execute one or more operations associated with the applications of the operating system (OS) 112 and/or perform any other suitable operation associated with processor activity, including comparison operations and executing instructions associated with memory 111. Example operating systems 112 include the Android® OS, iOS®, Linux®, and Windows® operating systems. As shown, the OS 112 includes one or more other applications 115, which can be access via an authentication or verification application or service 114 (hereinafter referred to as "authentication application" for convenience). The authentication application 114 can coordinate with the one or more servers 120, e.g. the management application 123 of one or more of the servers 120, to obtain or facilitate access to the one or more other applications 115 and/or features associated therewith, where the other applications 115 can have one or more features associated with services provided by a service provider associated with the one or more servers 120. In various embodiments, the other applications 115 can be associated with services provided by other devices and providers, and the authentication in relation therewith is associated with the one or more servers 120, which is in turn associated with a different service provider.

The authentication application 114 is generally configured to determine when a user associated with the user device 102b requires access to the one or more other applications 115, the other applications 115 may include one or more applications that have information related to or involve performing a function related to a particular service associated with a user account, such as a transportation service (e.g. public transit), health insurance account, a financial account or financial application that contains account balances, brokerage information, or any other suitable financial data, a service application (retail services, delivery services, entertainment services, gaming services, etc.), and any other suitable application that may require user and/or verification and/or authentication.

In various embodiments, the authentication application 114 performs a multi-level verification process with the one or more server 120 and the one or more secondary devices, e.g. 102d. In various embodiments, the authentication application 114 may facilitate the authentication protocol utilizing a separate API interface and call for access to one or more of the other applications 115.

In various embodiments, the authentication application 114 is associated with the account application, where the account application is part of the other applications 115. For example, the authentication application 114 may be installed on the user device 102b, and the user is prompted to enable the authentication application 114 subsequent to the installation. More generally, each time one of the other applications, e.g. an account application, is opened, the other application 115 may determine whether the authentication application 114 is enabled as the default authentication application for the OS 112. If the authentication application 114 is not enabled as the default authentication application, the other application 115 may prompt the user to enable the authentication application 114 as the default authentication application for the OS 112 and/or to enable one or more functionalities of the authentication application 114. Once enabled as the default authentication application for the OS 112, the authentication application 114 may programmatically identify when authorization applications require authentication and may utilize an authorization protocol as identified herein to access one or more features associated with the other applications 115.

In various embodiments, to access one or more features of one or more of the other applications 115, the authentication application 114 receives, from a user, a first application user credential associated with a user profile. The first application user credential may include biometrics data, an established gesture associated with user recognition, a username and password combination, and/or the like. The stored second application user credential may be associated with the user identity and it may be stored either in the memory 111 of the user device 102b, e.g. user account data 151 or in the memory 122 of the one or more servers 120, e.g. account data 132. In various embodiments, the first-level authentication or validation is performed at the user device 102b, e.g. the processor 119 compares the first application user credential (e.g. as entered by the user via a suitable interface of device 102b) with a stored second application user credential, where the stored second application user credential can be part of the user account data 151 stored on the user device 102b, and the stored second application can be stored into the user device 102b by any suitable method, including local entry methods and/or it can be transmitted to the user device 102b by any suitable application of server 120. In various embodiments, the stored second application user credential is maintained on the one or more servers 120 and the first match is performed by the one or more servers 120, e.g. a suitable application of the one or more servers 120 such as the management application 123 receives the first user credential from the authorization application 114 of the user device 102b, compares it at the one or more servers for a match, and in various embodiments, transmits a verification that a match has occurred back to the user device 102b.

In various embodiments, upon determining a first match between the first application user credential and the stored second application user credential, the authentication application 114 and/or the one or more servers 120 initiates the second-level authentication required to obtain access to one or more features of other applications 115. In various embodiments, completion of the first-level authentication grants access to certain features of one or more of the other applications 115, and completion of the second-level authentication (discussed in greater detail below) grants access to additional or all of the features associated with the one or more other applications 115.

In various embodiments, once the first match between the first application user credential and the stored second application user credential takes place, the second-level authentication or verification commences. In various embodiments, the user device 102, e.g. memory, can include one or more access mechanisms 128. In various embodiments, the user device 102b can receive access mechanisms 128 from the one or more servers 120 and/or the secondary devices 102a, 102c, and/or 102d, which can include any mechanism for facilitating access to one or more features of the other applications 115, and where the access mechanisms 128 can include one or more encryption mechanisms (e.g. encrypted codes) received from the server 120 and/or transmitted to the one or more secondary devices 102a, 102c, and/or 102d by the user device 102b (e.g. via the authentication application 114), and where the access mechanisms 128 can include one or more one or more decryption mechanisms, where the one or more decryption mechanisms can include decrypted versions of encrypted codes sent to the user device 102b from the one or more secondary devices 102a, 102c, and/or 102d. The authentication application 114 can concatenate and/or otherwise combine the decrypted outputs received from the one or more secondary devices 102a, 102c, and/or 102d, which can include identifier portions described in greater detail below, prior to transmitting them to the serer, and/or it can transmit the portions themselves, without combining or concatenating them, to the server at issue, provided that, in embodiments where the identifier portions are portions of an IP address to transmit the decrypted output or outputs to, e.g. a server IP address, the authentication application 114 can be configured to obtain and combine this information portion prior to making the transmission to the server or servers.

As shown, the server 120 includes memory 122 and a processor 131 for executing one or more operations in relation to the user sever 120. In various embodiments, the memory 121 can include an instance of an operating system (OS) 124 and the processor 131 may execute one or more operations associated with the applications of the operating system (OS) 124 and/or perform any other suitable operation associated with processor activity, including comparison operations and executing instructions associated with memory 121. Any suitable operating system as identified herein or otherwise suitable can be the OS 124.

In various embodiments, the operating system 124 can include one or more applications, including a management application 123 that includes at least the ability to provide one or more communications and the ability to provide one or more instructions to other devices, including the user device 102b and the one or more secondary devices 102a, 102c, and/or 102d, and where the management application 123 can coordinate with other components and applications of the server 120 to facilitate its various functions, including the operating system 124. The operating system 124 can further include one or more one or more encryption mechanisms 125 that is associated with access to one or more applications, which may include features that are associated with other applications 115 and accessible the user device 102b, and where the one or more encryption mechanisms 125 are transmittable to the user device 102b and/or the secondary devices 102a, 102c, and/or 102d via a first network 104. In various embodiments, where the one or more encryption mechanisms 125 are transmitted to the user device without also transmitting them to the one or more secondary devices 102a, 102c, and/or 102d, as stated above, the one or more encryption mechanisms 125 are in turn transmittable to the secondary devices 102a, 102c, and 102d by the user device 102b via a second network 105.

In various embodiments, the operating system 124 can further include one or more one or more decryption mechanisms 127 that are transmittable to one or more secondary devices 102a, 102c, and/or 102d via the network 104, and can be used by the one or more secondary devices 102a, 102c, and/or 102d to decrypt codes associated with the one or more encryption mechanisms 125, where decrypted outputs associated with the one or more encryption mechanisms 125 can be provided to the user device 102b over network 105, which in turn can be transmitted to the server 120, e.g. in order to obtain access to the relevant features of other applications 115, via network 105.

In various embodiments, the management application 123 can coordinate with the encryption mechanism 125 and/or decryption mechanism 127 to configure the overall encryption such that the type of network connection associated with network 105 is specified before any decryption of the encrypted codes can take place. For example, the encrypted mechanisms transmitted to the user device 102b and/or to the one or more secondary devices 102a, 102c, and/or 102d and/or the decryption mechanisms transmitted to the one or more secondary devices 102a, 102c, and/or 102d can be supplemented or include a protocol requirement condition, such that the decryption at the secondary devices and/or transmission of the decrypted output back the user device occurs only if the network connection of network 105 is of a particular type, e.g. Bluetooth, and/or if the user device 102b and/or the secondary devices 102a, 102c, and/or 102d are within a certain distance of each other. The latter feature can be implemented by having any suitable logic and/or configuration with respect to authorization application 114, management application 123, and/or one or more of the applications of the secondary devices that recognizes the protocol that is permitting the communication between the user device 102b and the secondary devices 102a, 102c, and/or 102d, and/or that implements any suitable distance computation technique, e.g. triangulation, etc.

In various embodiments, the operating system 124 can further include a confirmation application 129 that can confirm that the server 120 has received a final and complete decrypted output of the encrypted codes from the user device 102b, and thereafter the management application 123 can grant access to one or more features of the other applications to the user device 102b (and by extension to a user interfacing with the user device 102b). In various embodiments, as alluded to above, the mobile device can transmit each individual decrypted code portion to the server 120, and a relevant application or applications, e.g. the management application 123 and/or decryption mechanism 127 and/or confirmation application 129, can combine or otherwise utilize them to complete the verification and/or authentication process.

In various embodiments, the one or more servers have access to account data 132 with respect to data related to users and goods and/or services provided by the entity associated with the one or more servers 120 to the users, which can include stored authentication credentials, e.g. usernames and passwords, in addition to other information.

In various embodiments, the one or more of the servers 120, via the management application 123, can transmit one or more one or more encryption mechanisms 125 to the user device 102b. The one or more one or more encryption mechanisms 125 can be any suitable mechanism under any suitable encryption technique, including asymmetric and/or symmetric cryptography, where in various embodiments the one or more one or more encryption mechanisms 125 are one or more encrypted codes based on one or more or public keys.

In various embodiments, the management application 123 of the server 120 can transmit any one or more suitable one or more decryption mechanisms 127 associated with the one or more one or more encryption mechanisms 125 to each one of the secondary devices 102a, 102c, and/or 102d, where the one or more decryption mechanism 127 can be any suitable decryption technique based on any suitable mechanism under any suitable encryption technique, and corresponding to the encryption technique associated with the encryption mechanism 125, including asymmetric and/or symmetric cryptography, where in various embodiments the one or more encoded mechanisms 125 are based on one or more public keys, the one or more one or more decryption mechanisms 127 are based on one or more private keys in relation to the one or more public keys. In various embodiments, the secondary devices 102a, 102c, and/or 102d may connect to the server 120 to resync the encryption and/or decryption mechanisms (e.g., encryption mechanism 125, decryption mechanism 127, encrypted codes, etc.) at periodic timing intervals, e.g., hourly, daily, etc.

In various embodiments, each encryption mechanism 125 can provide an encryption vehicle, e.g. code, that is unique to a particular secondary device, e.g. 102d, e.g. an IP address identifier or other adjustment to the encryption code associated therewith that provides for a paired unique decryption that is distinct from the other secondary devices, e.g. the key is completely unique to each secondary device 102a, 102c, and/or 102d and/or another identifier (e.g. a portion of the IP address of the server that is responsible for receiving the decrypted output from the user device 102b) is compounded with the key to provide for a unique decryption and overall concatenation at the user device 102b for the final decryption and ultimate transmission back to the server. In various embodiments, when the decrypted outputs from each secondary device 102a, 102c, and/or 102d are transmitted to the user device 102b, the authentication application 114 of the user device 102b can be configured to perform any suitable operation, e.g. concatenation, to combine the decrypted output and/or the portion of the unique identifier (e.g. a portion of the server IP address responsible for processing the decrypted output) to generate the overall decrypted output and/or combined identifier that will be transmitted to the one or more servers 120 that can grant access to one or more features of the other applications 115.

In various embodiments, although one server 120 is shown as carrying out certain portions of the second-level authentication, more than one server 120 can be used, and functionalities, operations, and instructions that can be carried out by one server can be carried out by more than one server. For example, to increase security, one server 120 can be configured for transmitting the encryption and one or more decryption mechanisms over network 104, and a second server can be configured to receive the decrypted output from the user device 102b. In various embodiments, a first server 120 can transmit the one or more encryption mechanisms to the one or more secondary devices over network 104, a second server 120 can transmit the one or more decryption mechanisms over network 104 to one or more secondary devices 102a, 102c, and/or 102d, and a third server 120 can receive the decrypted output (e.g. and/or a confirmation of the same) over network 104 from the user device 102b. In various embodiments, where the server 120 that receives the confirmation from the user device is different from the server or servers transmitting the encryption and/or one or more decryption mechanisms, if a unique identifier or feature of the encryption and decryption process associated with each secondary device 102a, 102c, and/or 102d includes a portion of the IP address where the final decrypted output is to be transmitted, then the one or more servers making the transmission can transmit that IP portion (e.g. of the different server) as part of the encryption and/or decryption process to the relevant secondary device 102a, 102c, and/or 102d.

As shown, the one or more additional features, components and/or operations of secondary device 102d are explicitly shown, but those features, components, and/or operations can be applicable to the other secondary devices 102a and/or 102c.

In various embodiments, the secondary device 102d can include memory 136 and a processor 134 for executing one or more operations in relation to the secondary device 102d. In various embodiments, the memory 136 can include an instance of an operating system (OS) 137 and the processor 134 may execute one or more operations associated with the applications of the operating system (OS) 137 and/or perform any other suitable operation associated with processor activity, including comparison operations and executing instructions associated with memory 136. Any suitable operating system as identified herein or otherwise suitable can be the OS 137.

In various embodiments, the operating system 137 of secondary device 102d can include a decryption processing application 139 and an encryption processing application 138. In various embodiments, the secondary device 102d receives one or more encrypted mechanisms, e.g. encrypted codes, from the user device 102b, e.g. via the authentication application 114, and via network 105 and/or from the one or more servers 120, e.g. via the management application 123, and via network 104, and the encryption processing application 138 processes them in accordance with the method of encryption associated therewith. In various embodiments, the encryption mechanism received by the secondary device 102d and processed by the encryption application 138 contains at least one unique feature and/or identifier to the secondary device 102, which distinguishes it from encrypted codes transmitted to other secondary devices, e.g. 102a and/or 102c.

In various embodiments, the decryption processing application 139 receives from the one or more servers 120, e.g. via the management application 123, one or more decryption mechanisms associated with the one or more encryption mechanisms processed by the encryption processing application 138 via network 104, and the decryption processing application 139 processes them in accordance with the method of decryption (and by extension encryption) associated therewith. In various embodiments, the decryption processing application 139 can decrypt the encryption associated with the encryption mechanisms, e.g. encrypted code, utilizing the transmitted decryption mechanism (e.g. symmetric and asymmetric key techniques or other suitable techniques based on the type of encryption). In various embodiments, the decrypted output portion can contain a unique identifier portion of the destination of where the final decrypted portion, e.g. associated with the combined final decrypted output concatenated or otherwise combined by the user device 102b, should be sent for processing, e.g. a portion of the IP address of the server that is to grant access to the relevant portion of the one or more feature of other applications 115.

In various embodiments, irrespective of the nature of the decrypted output portion, the decrypted output portion is transmitted by the decryption processing application 139 to the user device 102b via network 105, where at least one application in relation with the user device 102b processes the decrypted outputted portion, where, in various embodiments, if other secondary devices such as 102a and 102c also received encrypted and decrypted mechanisms, the user device 102b concatenates and/or otherwise combines the various decrypted outputs, including, as applicable, any IP identifiers and/or IP addresses of the server or servers to receive the final decrypted output, and the user device transmits the final decrypted output to the server or servers that can grant access to the relevant portion of other applications 115, and where the relevant application of the receiving server, e.g. management application 123, authorizes the access to the relevant features of other application 115.

In various embodiments, multiple layers of encryption may be provided. For example, a code may be encrypted twice. A first layer of encryption may comprise encrypting the code for a first device, and a second layer of encryption may comprise encrypting the encrypted code for a second device. In such an embodiment, the server 120 may transmit such a code, which is decrypted by the second device to remove the second layer of encryption. The second device may then transmit the decrypted code (which includes the first layer of encryption) to the first device. The first device may then decrypt the first layer of encryption and send the decrypted message to the server for validation. In one such embodiment, the first device may comprise one or more of the secondary devices 102, and the second device may comprise the user device 101. In another such embodiment, the second device may comprise one or more of the secondary devices 102, and the first device may comprise the user device 101.

In various embodiments, as implied and stated above, the various devices, components, and/or applications of system 100 (e.g. 102a, 102b, 102c, 102d, and/or 120) can have additional functionalities, e.g. payment processing, gaming, telephonic, audio-visual, etc., and the above is intended to highlight certain relevant features of the present disclosure. In various embodiments, as implied and stated above the, the access granted with respect to the authentication and/or verification technique described above can be to other features, components, devices other than those associated with other application 115, e.g. other networks, other devices, and/or applications distinct from those described above.

Figure 2:
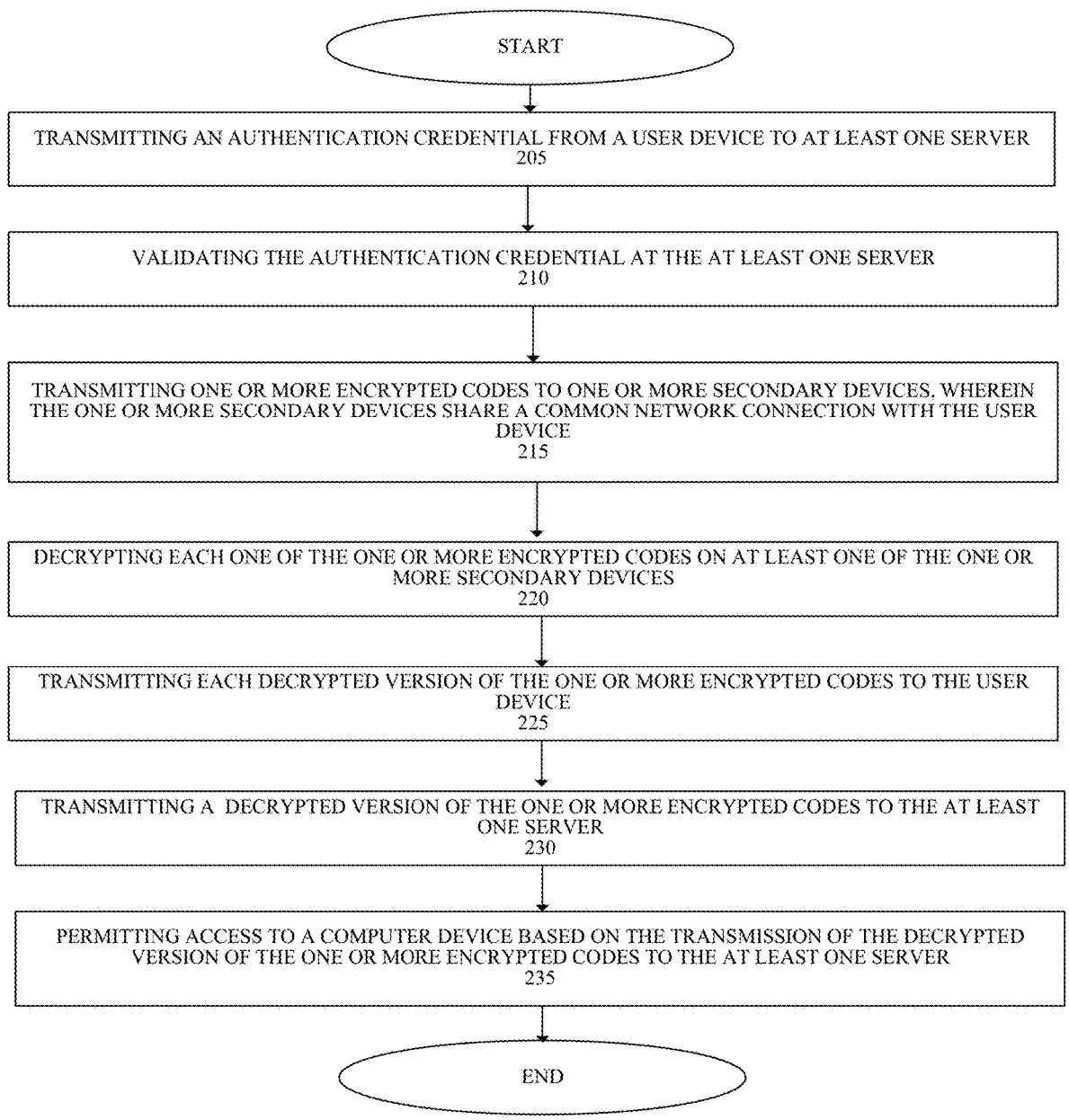
FIG. 2 illustrates an examples of one or more processing flows for encryption, decryption, and/or accessing a network and/or systems, components, and/or devices associated with the network and according to at least one embodiment of the present disclosure.

FIG. 2 illustrates an example of a logic flow 200 that may be representative of some or all of the operations executed by one or more embodiments described herein. For example, the logic flow 200 may illustrate operations performed by an encryption, decryption and/or access system and/or components described herein, or as otherwise may be suitable, to encrypt and/or decrypt aspects of a communication, and/or to grant access to one or more networks, components, features, or applications based on a verification or authentication scheme associated with a particular encryption and/or decryption.

At block 205, one or more embodiments of the logic flow 200 may include at least one component as described in the present disclosure transmitting an authentication credential from a user device to at least one server, and at block 210, one or more embodiments of the logic flow 200 may include at least one component as described in the present disclosure validating the authentication credential at the at least one server. In various embodiments, the authentication credential can be a username and password combination, or other suitable technique, associated with an application hosted by the server and accessed by a mobile device, and where the username and password are entered in on an interface of the mobile device and validated at the server.

At block 215, one or more embodiments of the logic flow 200 may include at least one component as described in the present disclosure transmitting one or more encrypted codes to one or more secondary devices, where the one or more secondary devices share a common network connection with the user device. In various embodiments, either one or both the server and/or the mobile device can transmit the one or more encrypted codes to secondary devices, e.g. other computing devices, over a suitable network. The server can transmit the encrypted codes over a first network, e.g. internet and/or the mobile device can transmit the encrypted codes over a second network, e.g. a local connection, such as i) a Bluetooth network connection, ii) an intranet network connection, iii) a near field communication (NFC) connection, and/or iv) a mesh network connection. At block 220, one or more embodiments of the logic flow may include at least one component as described in the present disclosure decrypting each one of the one or more encrypted codes on at least one of the one or more secondary devices.

The encrypted codes can be based on any suitable cryptographic technique, e.g. symmetric or asymmetric cryptography, where the decrypted version of the codes, e.g. an output based on any suitable key-based encryption/technique, are combinable at the mobile device to form a final decrypted output that can be transmitted to other devices, e.g. the server, for final authentication and/or validation. In various embodiments, each encrypted code portion transmitted to each of the secondary devices is unique to that secondary device, and the decrypted portion in relation to that encrypted code portion is similarly unique to the secondary device associated therewith.

In various embodiments, the encrypted codes may include an encryption technique or an identifying technique that supplements the encryption, including having an identifier portion, e.g. a portion of an IP address of the server that is to receive the final decrypted output, which when combined with the other identifier portions (e.g. after decryption) associated with the other secondary devices, provides for the IP address of the server to receive the final decrypted output. In various embodiments, the one or more secondary devices receive the decryption mechanism that can facilitate decryption of the respective encrypted code associated with each one of the one or more decrypted codes, where the decryption mechanism is based on the decryption scheme that is associated with the encryption scheme of the encrypted codes (e.g. a suitable key to perform the decryption). In various embodiments, the decryption mechanism can also be configured to obtain the IP portion of the server to receive the combined final decrypted output of the decrypted output portions of each secondary device.

In various embodiments, the server can periodically transmit the decryption mechanisms and/or encryption mechanisms to the one or more secondary devices, even prior to the initial authentication utilizing the authentication credential. In various embodiments, only the decryption mechanisms are transmitted periodically prior to utilizing the initial authentication credential.

In various embodiments, at block 220, one or more embodiments of the logic flow 200 may include at least one component as described in the present disclosure transmitting each decrypted version of the one or more encrypted codes to the user device, e.g. after each secondary device decrypts its associated encrypted code, each secondary device can transmit the decrypted output to the mobile device over the local connection, e.g. such as i) a Bluetooth network connection, ii) an intranet network connection, iii) a near field communication (NFC) connection, and/or iv) a mesh network connection shared by the mobile device and the one or more secondary devices.

In various embodiments, at block 225, one or more embodiments of the logic flow 200 may include at least one component as described in the present disclosure transmitting each decrypted version of the one or more encrypted codes to the user device, e.g. after each secondary device decrypts its associated encrypted code, each secondary device can transmit the decrypted output to the mobile device over the local connection, e.g. such as i) a Bluetooth network connection, ii) an intranet network connection, iii) a near field communication (NFC) connection, and/or iv) a mesh network connection shared by the mobile device and the one or more secondary devices, where the transmission can also include any portion identifiers associated with the decryption or supplemental identification technique, e.g. the portion of the IP address of the server to receive the final decrypted output.

In various embodiments, at block 230, one or more embodiments of the logic flow 200 may include at least one component as described in the present disclosure transmitting a decrypted version of the one or more encrypted codes to the server. In various embodiments, this can include the mobile device combining and/or concatenating the decrypted versions of the encrypted code portions into a combined decrypted code, and then transmitting the same to the server and/or the mobile device can transmit the decrypted portions, without combining and/or concatenating them, to the server, where the server can perform the concatenating and/or combining and/or any other suitable operation to facilitate the access associated with the authentication and/or verification aspects of flow 200. In various embodiments, where the decrypted code portions include IP address portions of the server to receive the decrypted output and/or confirm its validity, the mobile device can be configured to combine the IP address portions even if it transmits the rest of the decrypted portions out as portions, as opposed to a combined and/or concatenated whole.

In various embodiments, the server transmitting the encrypted and/or decrypted mechanisms is distinct from the server receiving the final decrypted output and facilitating access, e.g. at least two servers are associated with the flow, at least one server for transmitting the encrypted and/or encrypted mechanisms to the various devices, and at least one distinct server for receiving the final decrypted output.

In various embodiments, at block 235, permitting access to a computer device based on the transmission of the decrypted version of the one or more encrypted codes to the at least one server. In various embodiments, the access can be to one or more features of a mobile application hosted by the server and accessible by the user via the mobile device, including but not limited to a payment or account application associated with a financial institution.

Figure 3:
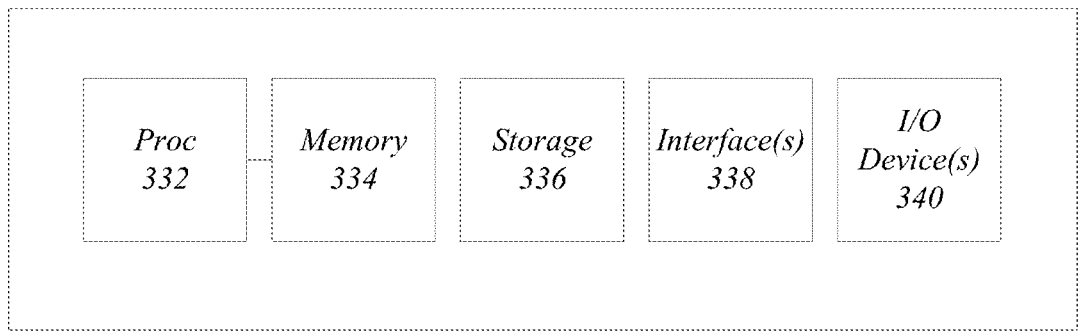
FIG. 3 illustrates a machine learning system according to an embodiment of the present disclosure

FIG. 3 illustrates an example of an encoding, decoding and/or access system 306. The encoding, decoding and/or access system 306 includes one or more processor(s) 332, memory 334, storage 336, one or more interface(s) 338, and one or more I/O device(s) 340.

In embodiments, the encoding, decoding and/or message transmission system 306 may be a processing system that includes one or more servers or computing devices that are interconnected via one or more network links, e.g., wired, wireless, fiber, etc. In some instances, the transaction services system may be a distributed computing system. Each of the servers may include one or more processor(s) 332, which may include one or more processing cores to process information and data. Moreover, the one or more processors 332 can include one or more processing devices, such as a microprocessor manufactured by Intel™, AMD™, or any of various processors. The disclosed embodiments are not limited to any type of processor(s).

Memory 334 can include one or more memory (volatile or non-volatile) devices configured to store instructions used by the one or more processors 332 to perform one or more operations consistent with the disclosed embodiments. For example, memory 334 can be configured with one or more software instructions, such as programs that can perform one or more operations when executed by the one or more processors 332.

The disclosed embodiments are not limited to separate programs or computers configured to perform dedicated tasks. For example, memory 334 can include a single program that performs the operations or could comprise multiple programs. Memory 334 can also store data that can reflect any type of information in any format that the system can use to perform operations consistent with the disclosed embodiments.

In embodiments, the transaction services system 306 may include one or more storage devices 336. The storage devices 336 may include HDDs, flash memory devices, optical storage devices, floppy storage devices, etc. In some instances, the storage devices 356 may include cloud-based storage devices that may be accessed via a network interface. In some embodiments, the storage 336 may be configured to store one or more databases and/or as a distributed database system to store information and data. Databases can include one or more memory devices that store information and are accessed and/or managed through the transaction services system 504. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, transaction services system 306 can include databases located remotely from other transaction services system 306 devices. The databases can include computing components (e.g., database management system, database server, etc.) configured to receive and process requests for data stored in memory devices of databases and to provide data from databases.

Figure 4:
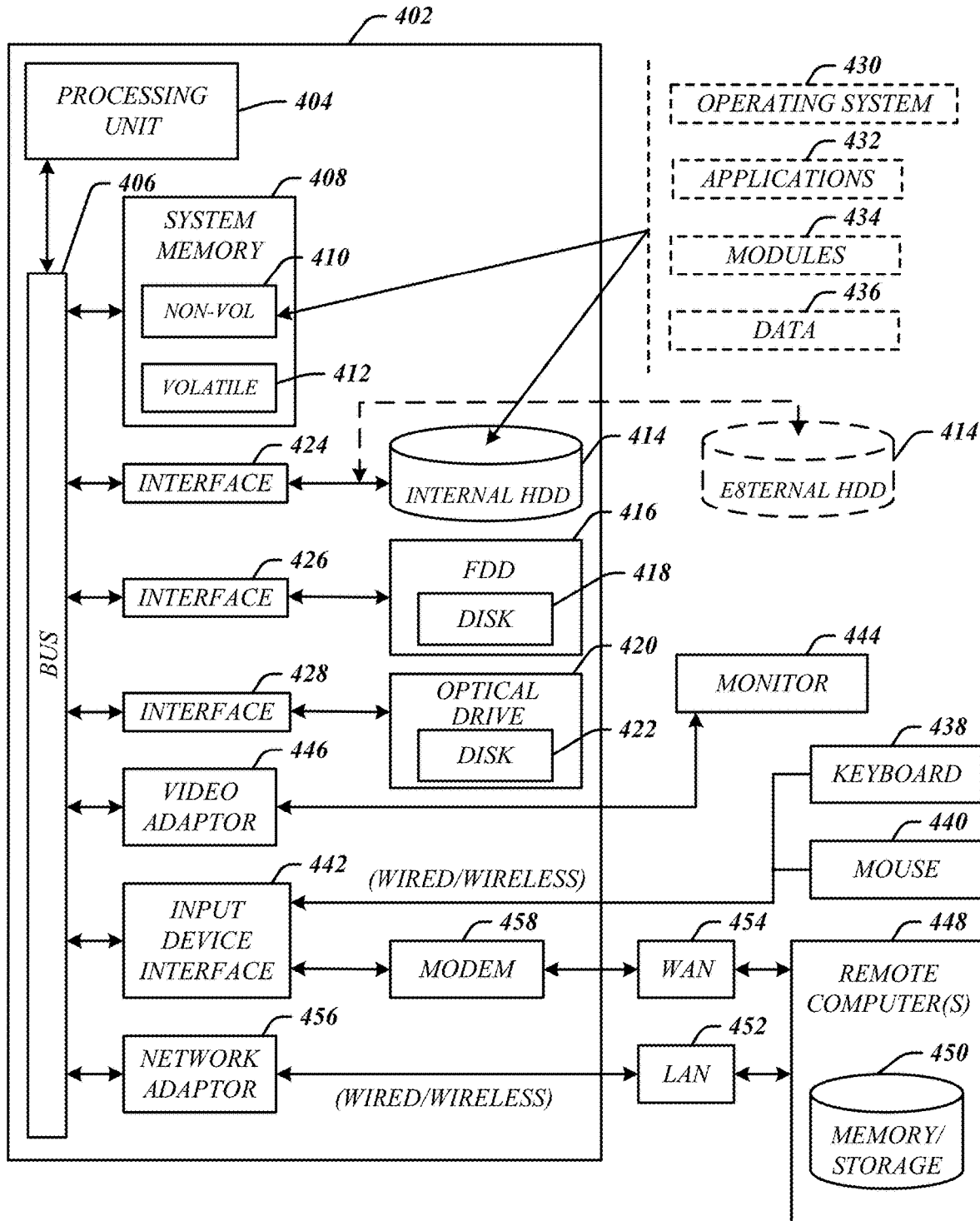
FIG. 4 illustrates an embodiment of a computing architecture useful with at least one embodiment of the present disclosure.

FIG. 4 illustrates an embodiment of an exemplary computing architecture 400 suitable for implementing one or more embodiments as previously described. In one embodiment, the computing architecture 400 may include or be implemented as part of system 100.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 400 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 400.

As shown in FIG. 4, the computing architecture 400 includes a processing unit 404, a system memory 406 and a system bus 408. The processing unit 404 can be any of various commercially available processors.

The system bus 408 provides an interface for system components including, but not limited to, the system memory 406 to the processing unit 404. The system bus 408 can be any of several types of bus structure that may further interconnect to a memory bus (with or without a memory controller), a peripheral bus, and a local bus using any of a variety of commercially available bus architectures. Interface adapters may connect to the system bus 408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 400 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 5, the system memory 406 can include non-volatile memory 410 and/or volatile memory 412. A basic input/output system (BIOS) can be stored in the non-volatile memory 410.

The computer 402 may include various types of computer-readable storage media in the form of one or more lower speed memory units, including an internal (or external) hard disk drive (HDD) 414, a magnetic floppy disk drive (FDD) 416 to read from or write to a removable magnetic disk 418, and an optical disk drive 420 to read from or write to a removable optical disk 422 (e.g., a CD-ROM or DVD). The HDD 414, FDD 416 and optical disk drive 420 can be connected to the system bus 408 by an HDD interface 424, an FDD interface 426 and an optical drive interface 428, respectively. The HDD interface 424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 410, 412, including an operating system 430, one or more application programs 432, other program modules 434, and program data 436. In one embodiment, the one or more application programs 432, other program modules 434, and program data 436 can include, for example, the various applications and/or components of the system 600.

A user can enter commands and information into the computer 402 through one or more wire/wireless input devices, for example, a keyboard 438 and a pointing device, such as a mouse 440. Other input devices may include microphones, infra-red (IR) remote controls, radio-frequency (RF) remote controls, gamepads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 404 through an input device interface 442 that is coupled to the system bus 408 but can be connected by other interfaces such as a parallel port, IEEE 1394 serial port, a game port, a USB port, an IR interface, and so forth.

A monitor 444 or other type of display device is also connected to the system bus 408 via an interface, such as a video adaptor 446. The monitor 444 may be internal or external to the computer 402. In addition to the monitor 444, a computer typically includes other peripheral output devices, such as speakers, printers, and so forth.

The computer 402 may operate in a networked environment using logical connections via wire and/or wireless communications to one or more remote computers, such as a remote computer 448. The remote computer 448 can be a workstation, a server computer, a router, a personal computer, portable computer, microprocessor-based entertainment appliance, a peer device or other common network node, and typically includes many or all the elements described relative to the computer 402, although, for purposes of brevity, only a memory/storage device 450 is illustrated. The logical connections depicted include wire/wireless connectivity to a local area network (LAN) 452 and/or larger networks, for example, a wide area network (WAN) 454. Such LAN and WAN networking environments are commonplace in offices and companies, and facilitate enterprise-wide computer networks, such as intranets, all of which may connect to a global communications network, for example, the Internet.

When used in a LAN networking environment, the computer 402 is connected to the LAN 452 through a wire and/or wireless communication network interface or adaptor 456. The adaptor 456 can facilitate wire and/or wireless communications to the LAN 452, which may also include a wireless access point disposed thereon for communicating with the wireless functionality of the adaptor 456.

When used in a WAN networking environment, the computer 402 can include a modem 458, or is connected to a communications server on the WAN 454 or has other means for establishing communications over the WAN 454, such as by way of the Internet. The modem 458, which can be internal or external and a wire and/or wireless device, connects to the system bus 408 via the input device interface 442. In a networked environment, program modules depicted relative to the computer 402, or portions thereof, can be stored in the remote memory/storage device 450. It will be appreciated that the network connections shown are exemplary and other means of establishing a communications link between the computers can be used.

The computer 402 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-4 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 5:
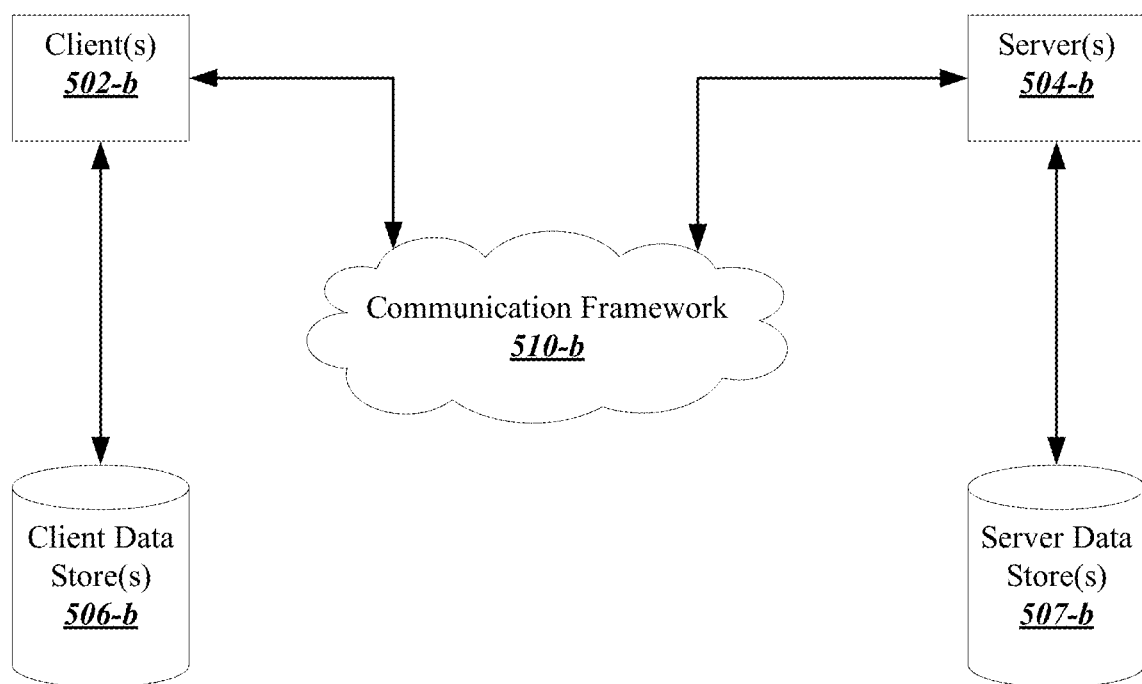
FIG. 5 illustrates an embodiment of a communications architecture useful with at least one embodiment of the present disclosure.

FIG. 5 is a block diagram depicting an exemplary communications architecture 500 suitable for implementing one or more embodiments as previously described. The communications architecture 500 includes various common communications elements, such as a transmitter, receiver, transceiver, radio, network interface, baseband processor, antenna, amplifiers, filters, power supplies, and so forth. The embodiments, however, are not limited to implementation by the communications architecture 500, which may be consistent with system 100.

As shown in FIG. 5, the communications architecture 500 includes one or more clients 502 and servers 504. The servers 504 may implement the server device 306. The clients 502 and the servers 504 are operatively connected to one or more respective client data stores 506 and server data stores 507 that can be employed to store information local to the respective clients 502 and servers 504, such as cookies and/or associated contextual information.

The clients 502 and the servers 504 may communicate information between each other using a communication framework 510. The communications framework 510 may implement any well-known communications techniques and protocols. The communications framework 510 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 510 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 502 and the servers 504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

One or more embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A method, comprising:
   transmitting, by a first device via a first network, an authentication credential to a server;
   receiving, by the first device via the first network, a plurality of encrypted codes from the server based on the authentication credential;
   transmitting, by the first device via a second network, respective ones of the encrypted codes to respective ones of a plurality of secondary devices;
   receiving, by the first device via the second network, a respective decrypted code from each of the plurality of the secondary devices;
   combining, by the first device, the decrypted codes;
   transmitting, by the first device via the first network, the combined decrypted codes to the server; and
   permitting, by the first device, access to a computing resource based on the transmission of the combined decrypted codes to the server.

2. The method of claim 1, wherein the decrypted codes are received only if the second network exists, wherein the computing resource comprises one or more of: an application, a computing device, and the first network.

3. The method of claim 1, wherein the second network comprises one or more of a Bluetooth network, an intranet network, a near field communication (NFC) network, and a mesh network.

4. The method of claim 1, wherein at least two of the plurality of encrypted codes include a respective portion of an address associated with the server.

5. The method of claim 4, further comprising:
   combining the portions of the address to generate the address of the server.

6. The method of claim 5, wherein the address of the server comprises an internet protocol (IP) address of the server, wherein the combined decrypted codes are transmitted to the server based on the IP address of the server.

7. The method of claim 1, further comprising prior to receiving the decrypted codes:
   receiving, by the first device from the server via the first network, a plurality of decryption mechanisms; and transmitting, by the first device via the second network, respective ones of the plurality of decryption mechanisms to respective ones of the plurality of secondary devices.

8. A non-transitory computer-readable storage medium, the computer-readable storage medium including instructions that when executed by a processor, cause the processor to:
- transmit, via a first network, an authentication credential to a server;
- receive, via the first network, a plurality of encrypted codes from the server based on the authentication credential;
- transmit, via a second network, respective ones of the encrypted codes to respective ones of a plurality of secondary devices;
- receive, via the second network, a respective decrypted code from each of the plurality of the secondary devices;
- combine the decrypted codes;
- transmit, via the first network, the combined decrypted codes to the server; and
- permit access to a computing resource based on the transmission of the combined decrypted codes to the server.

9. The computer-readable storage medium of claim 8, wherein the decrypted codes are received only if the second network exists, wherein the computing resource comprises one or more of: an application, a computing device, and the first network.

10. The computer-readable storage medium of claim 8, wherein the second network comprises one or more of a Bluetooth network, an intranet network, a near field communication (NFC) network, and a mesh network.

11. The computer-readable storage medium of claim 8, wherein at least two of the plurality of encrypted codes include a respective portion of an address associated with the server.

12. The computer-readable storage medium of claim 11, wherein the instructions further cause the processor to:
- combine the portions of the address to generate the address of the server.

13. The computer-readable storage medium of claim 12, wherein the address of the server comprises an internet protocol (IP) address of the server, wherein the combined decrypted codes are transmitted to the server based on the IP address of the server.

14. The computer-readable storage medium of claim 8, wherein the instructions further cause the processor to, prior to receiving the decrypted codes:
- receive, from the server via the first network, a plurality of decryption mechanisms; and
- transmit, via the second network, respective ones of the plurality of decryption mechanisms to respective ones of the plurality of secondary devices.

15. An apparatus comprising:
- a processor; and
- a memory storing instructions that, when executed by the processor, cause the processor to:
- transmit, via a first network, an authentication credential to a server;
- receive, via the first network, a plurality of encrypted codes from the server based on the authentication credential;
- transmit, via a second network, respective ones of the encrypted codes to respective ones of a plurality of secondary devices;
- receive, via the second network, a respective decrypted code from each of the plurality of the secondary devices;
- combine the decrypted codes;
- transmit, via the first network, the combined decrypted codes to the server; and
- permit access to a computing resource based on the transmission of the combined decrypted codes to the server.

16. The apparatus of claim 15, wherein the decrypted codes are received only if the second network exists, wherein the computing resource comprises one or more of: an application, a computing device, and the first network.

17. The apparatus of claim 15, wherein the second network comprises one or more of a Bluetooth network, an intranet network, a near field communication (NFC) network, and a mesh network.

18. The apparatus of claim 15, wherein at least two of the plurality of encrypted codes include a respective portion of an address associated with the server.

19. The apparatus of claim 18, wherein the instructions further cause the processor to:
- combine the portions of the address to generate the address of the server.

20. The apparatus of claim 19, wherein the address of the server comprises an internet protocol (IP) address of the server, wherein the combined decrypted codes are transmitted to the server based on the IP address of the server.

* * * * *